(12) United States Patent
Kuo et al.

(10) Patent No.: US 11,451,299 B2
(45) Date of Patent: Sep. 20, 2022

(54) PASSIVE OPTICAL NETWORK DEVICE

(71) Applicant: EZCONN CORPORATION, New Taipei (TW)

(72) Inventors: I yu Kuo, New Taipei (TW); Yu te Chou, New Taipei (TW); Shih chieh Kang, New Taipei (TW)

(73) Assignee: EZconn Corporation, New Taipei (TW)

( * ) Notice: Subject to any disclaimer, the term of this patent is extended or adjusted under 35 U.S.C. 154(b) by 62 days.

(21) Appl. No.: 16/942,790

(22) Filed: Jul. 30, 2020

(65) Prior Publication Data
US 2021/0036780 A1 Feb. 4, 2021

(30) Foreign Application Priority Data

Aug. 2, 2019 (TW) .................................. 108210252

(51) Int. Cl.
*H04B 10/2575* (2013.01)
*H04Q 11/00* (2006.01)
*H04B 10/40* (2013.01)
*H04J 14/02* (2006.01)
*H04L 12/70* (2013.01)

(52) U.S. Cl.
CPC ....... *H04B 10/25753* (2013.01); *H04B 10/40* (2013.01); *H04J 14/023* (2013.01); *H04Q 11/0067* (2013.01); *H04L 2012/5605* (2013.01)

(58) Field of Classification Search
None
See application file for complete search history.

(56) References Cited

U.S. PATENT DOCUMENTS

| | | | | |
|---|---|---|---|---|
| 2007/0147844 A1* | 6/2007 | Harres | ...................... | H04L 5/14 398/135 |
| 2009/0047027 A1* | 2/2009 | Liu | .......................... | H05K 1/141 398/135 |
| 2010/0014868 A1* | 1/2010 | McGlynn | ......... | H04B 10/25759 398/115 |
| 2010/0021171 A1* | 1/2010 | Wang | ..................... | B82Y 20/00 398/82 |
| 2018/0331767 A1* | 11/2018 | Shurki | ............. | H04B 10/07955 |

* cited by examiner

*Primary Examiner* — David W Lambert

(57) ABSTRACT

A passive optical network device comprising a casing, printed circuit board, and fiber optic transceiver system is provided. The fiber optic transceiver system comprises a fiber optic components device, fiber optic transceiver, and RF connector. During operation, the fiber optic components device converts optical signals from the fiber optic transceiver to digital signals, and then transmits the converted digital signals to external electronic systems via the hot-pluggable transceiver connection interface. The fiber optic components device converts digital signals from the external electronic systems to optical signals, and then transmits the optical signals to other external electronic systems via the fiber optic transceiver. The RF connector transmits RF signals from additional external electronic systems to the external electronic systems via the hot-pluggable transceiver connection interface. The RF connector transmits digital signals from the external electronic systems to the additional external electronic systems via the hot-pluggable transceiver connection interface.

17 Claims, 3 Drawing Sheets

PASSIVE OPTICAL NETWORK DEVICE

RELATED APPLICATIONS

The application claims the benefit of priority to Taiwan application no. 108210252, filed on Aug. 2, 2019, of which is incorporated herein by reference in its entirety.

TECHNICAL FIELD

Example embodiments relate generally to the field of communications and, more particularly, to passive optical network devices.

BACKGROUND

A PON is a point to multi-point (P2MP) passive optical network, which may be used for Internet access, voice over Internet protocol (VoIP), digital TV delivery, backhaul connections for cellular basestations, Wi-Fi hotspots, and distributed antenna systems (DAS), as examples. Basically, a PON system is composed of a central optical line terminal (OLT) at a service provider's facility, distributing services to customers. Passive optical devices, such as optical splitters divide a single optical signal into multiple equal but lower-power signals to users. An optical network unit (ONU), terminates the PON at a customer's location and may communicate with or be incorporated with an optical network terminal (ONT), which connects the PON to a customer's equipment.

Gigabit-capable PON or GPON is a standard created by the International Telecommunication Union-Telecommunication Standardization Sector (ITU-T), designated as ITU-T G.984. GPON uses optical wavelength division multiplexing (WDM), having downstream and upstream data rates of 2.488 Gbits/s and 1.244 Gbits/s, respectively. Generally, a laser on a wavelength ($\lambda$) of 1490 nm transmits the downstream data and the upstream data is transmitted on a wavelength of 1310 nm. The optical splits of the single fiber may be 1:32, 1:64 or up to 1:128 subscribers with a maximum transmission range of 20 km.

GPON devices may comprise a casing and a printed circuit board assembled to the casing, having a plurality of pins, such as 1×20 pins. Printed circuit boards of other devices are installed or inserted to the GPON devices via the pins. One such device may be an optical transceiver module having a single mode Subscriber Connector/Standard Connector (SC) fiber optic pigtail, whereby one portion of the optical transceiver module is electrically coupled to the GPON device via the pins and the single mode SC fiber optic pigtail is extended to an outside of a casing of the GPON device to receive and transmit optical signals from other external devices. The optical transceiver module may further electrically couple to a radio frequency RF connector to receive and transmit RF signals from additional external devices.

As demand for video and over the top (OTT) TV services has increased, need to boost line rates to handle high-definition video data has increased. As a result, the 10 Gbits/s Ethernet PON or 10G-EPON standard has been created by the Institute of Electrical and Electronics Engineers (IEEE), designated as IEEE 802.3av. 10G-EPON uses optical wavelength division multiplexing (WDM), having downstream and upstream data rates of 10.3125 Gbits/s for symmetric architectures and downstream and upstream data rates of 10.3125 Gbits/s and 1.25 Gbits/s, respectively, for asymmetric architectures. Generally, a laser on a wavelength ($\lambda$) of 1575 to 1580 nm transmits the downstream data and the upstream data is transmitted on a wavelength of 1260 to 1280 nm for 10G-EPON and a laser on a wavelength ($\lambda$) of 1260 to 1360 nm transmits the downstream data and the upstream data is transmitted on a wavelength of 1480 to 1500 nm for 1G-EPON. The optical splits of the single fiber may be 1:16 up to 1:128 subscribers with a maximum transmission range of 20 km.

Nonetheless, GPON devices having the plurality of contacts or pins, such as 1×20 pins, are not suited to support the higher transmission rates. Additionally, maintenance or replacement of other devices installed to the GPON devices via the pins is time consuming and inconvenient due to the pin coupling method. Moreover, immediate replacement due to the pin coupling method is not possible, compounding potential problems when other device failure occurs. Also, the length of the single mode SC fiber optic pigtail of the optical transceiver module installed to the GPON devices, extending to the outside of the GPON device casing, is normally fixed. Accordingly, if a longer single mode SC fiber optic pigtail is required, the GPON device would not be compatible or an extension cable may be used, increasing signal attenuation and inconvenience.

SUMMARY

In an embodiment, a passive optical network device, comprising a casing, a printed circuit board, and a fiber optic transceiver system is provided. The casing has a first opening, a first side wall, and a second side wall. The printed circuit board is fixedly assembled to the casing and has a plurality of first electrical coupling pads, a second electrical coupling pad, and a hot-pluggable transceiver connector mating interface. The hot-pluggable transceiver connector mating interface is positioned for mounting from an outside of the casing via the first opening. The fiber optic transceiver system is fixedly assembled to the printed circuit board and has a fiber optic components device assembled to the printed circuit board, a fiber optic transceiver assembled to the first side wall, and an RF connector assembled to the second side wall, comprising an RF signal line electrically coupled to the second electrical coupling pad. The fiber optic components device comprises a plurality of electrical coupling lines electrically coupled to the plurality of first electrical coupling pads, respectively.

In some embodiments, the fiber optic transceiver system further comprises a fiber optic cable, electrically coupling the fiber optic transceiver to the fiber optic components device. In some embodiments, the hot-pluggable transceiver connector mating interface is a small form-factor pluggable (SFP) transceiver connector mating interface. In some embodiments, the fiber optic components device comprises a single fiber three-wavelength triplexer. In some embodiments, the fiber optic components device comprises a single fiber two-wavelength diplexer.

In some embodiments, the passive optical network device further comprises a fiber optic connector housing having an external port and an internal port and the casing further comprises a second opening through the first side wall thereof. The fiber optic connector housing is assembled to the second opening. The internal port is positioned facing an inside of the casing and the external port is positioned facing an outside of the casing. The fiber optic transceiver is mounted to the internal port and the external port is configured to attachably receive external fiber optic connectors.

In some embodiments, the fiber optic transceiver comprises a single mode subscriber connector (SC) fiber optic pigtail. In some embodiments, the casing further comprises a plurality of third openings on the second side wall thereof, respectively, and the RF connector further comprises a plurality of protrusions. The shape of the plurality of protrusions corresponds to the shape of the plurality of third openings, and the plurality of protrusions is fixedly received in the plurality of third openings when the RF connector is assembled to the second side wall. In some embodiments, the shape of at least one of the plurality of third openings and plurality of protrusions is arc-shaped.

In some embodiments, the first side wall is the same side wall as the second side wall, whereby the RF connector is assembled next to the fiber optic transceiver.

In an alternative embodiment, a passive optical network device, comprising a casing, a printed circuit board, a fiber optic connector housing, and a fiber optic transceiver system is provided. The casing has a first opening, a first side wall, a second opening through the first side wall, and a second side wall. The printed circuit board is fixedly assembled to the casing and has a plurality of first electrical coupling pads, a second electrical coupling pad, and a hot-pluggable transceiver connector mating interface. The hot-pluggable transceiver connector mating interface is positioned for mounting from an outside of the casing via the first opening. The fiber optic connector housing has an external port and an internal port, wherein the fiber optic connector housing is assembled to the second opening. The internal port is positioned facing an inside of the casing and the external port is positioned facing an outside of the casing. The fiber optic transceiver system is fixedly assembled to the printed circuit board and has a fiber optic components device assembled to the printed circuit board, a fiber optic transceiver mounted to the internal port and an RF connector assembled to the second side wall, comprising an RF signal line electrically coupled to the second electrical coupling pad. The external port is configured to attachably receive external fiber optic connectors. The fiber optic components device comprises a plurality of electrical coupling lines electrically coupled to the plurality of first electrical coupling pads, respectively.

In some alternative embodiments, the fiber optic transceiver system further comprises a fiber optic cable, electrically coupling the fiber optic transceiver to the fiber optic components device. In some alternative embodiments, the hot-pluggable transceiver connector mating interface is a small form-factor pluggable (SFP) transceiver connector mating interface. In some alternative embodiments, the fiber optic components device comprises a single fiber three-wavelength triplexer. In some alternative embodiments, the fiber optic components device comprises a single fiber two-wavelength diplexer. In some alternative embodiments, the fiber optic transceiver comprises a single mode subscriber connector (SC) fiber optic pigtail.

In some alternative embodiments, the casing further comprises a plurality of third openings on the second side wall thereof, respectively, and the RF connector further comprises a plurality of protrusions. The shape of the plurality of protrusions corresponds to the shape of the plurality of third openings, and the plurality of protrusions is fixedly received in the plurality of third openings when the RF connector is assembled to the second side wall. In some alternative embodiments, the shape of at least one of the plurality of third openings and plurality of protrusions is arc-shaped.

In some alternative embodiments, the first side wall is the same side wall as the second side wall, whereby the RF connector is assembled next to the fiber optic transceiver.

BRIEF DESCRIPTION OF THE DRAWINGS

Unless specified otherwise, the accompanying drawings illustrate aspects of the innovative subject matter described herein. Referring to the drawings, wherein like reference numerals indicate similar parts throughout the several views, several examples of heatsink fins incorporating aspects of the presently disclosed principles are illustrated by way of example, and not by way of limitation.

DETAILED DESCRIPTION

The following describes various principles related to communication systems by way of reference to specific examples of passive optical network devices, including arrangements and examples of hot-pluggable connector assemblies and fiber optic transceiver systems embodying innovative concepts. More particularly, but not exclusively, such innovative principles are described in relation to selected examples of hot-pluggable connector assemblies, fiber optic component devices, fiber optic transceivers, and RF connectors and well-known functions or constructions are be described in detail for purposes of succinctness and clarity. Nonetheless, one or more of the disclosed principles can be incorporated in various other embodiments of the passive optical network devices to achieve any of a variety of desired outcomes, characteristics, and/or performance criteria.

Thus, hot-pluggable connector assemblies, fiber optic component devices, fiber optic transceivers, and RF connectors having attributes that are different from those specific examples discussed herein can embody one or more of the innovative principles, and can be used in applications not described herein in detail. Accordingly, embodiments of hot-pluggable connector assemblies, fiber optic component devices, fiber optic transceivers, and RF connectors not described herein in detail also fall within the scope of this disclosure, as will be appreciated by those having ordinary skill in the relevant art following a review of this disclosure.

Example embodiments as disclosed herein are directed to 10 Gbits/s passive optical network (PON) devices. In an embodiment, a passive optical network device comprising a casing, printed circuit board, and fiber optic transceiver system is provided. The fiber optic transceiver system comprises a fiber optic components device, fiber optic transceiver, and RF connector. During operation, the fiber optic components device converts optical signals from the fiber optic transceiver to digital signals, and then transmits the converted digital signals to external electronic systems via the hot-pluggable transceiver connection interface. The fiber optic components device converts digital signals from the external electronic systems to optical signals, and then transmits the optical signals to other external electronic systems via the fiber optic transceiver. The RF connector transmits RF signals from additional external electronic systems to the external electronic systems via the hot-pluggable transceiver connection interface. The RF connector transmits digital signals from the external electronic systems to the additional external electronic systems via the hot-pluggable transceiver connection interface.

Figure 1:
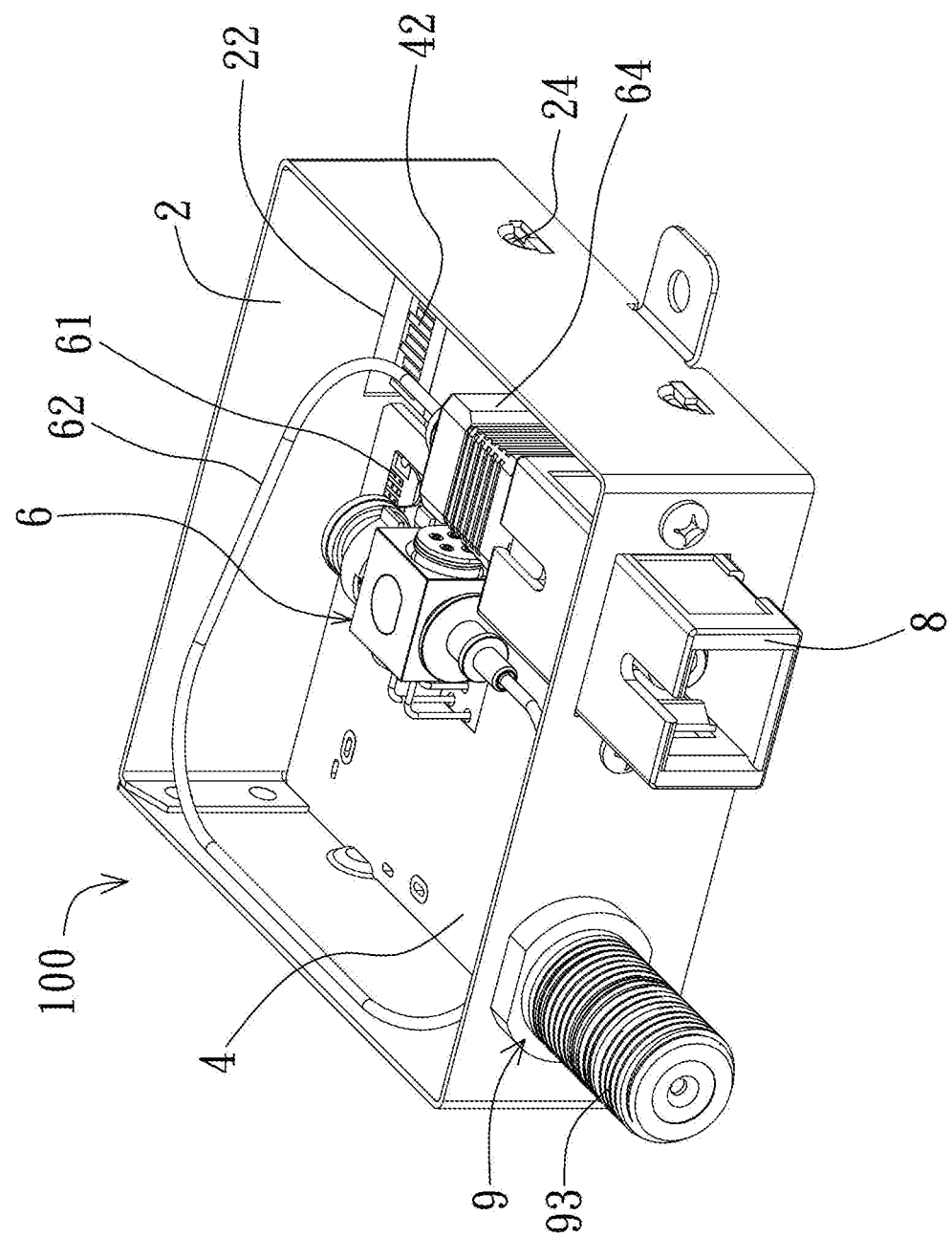
FIG. 1 is a schematic prospective first view of an inside of a passive optical network device, according to an example embodiment.
Figure 2:
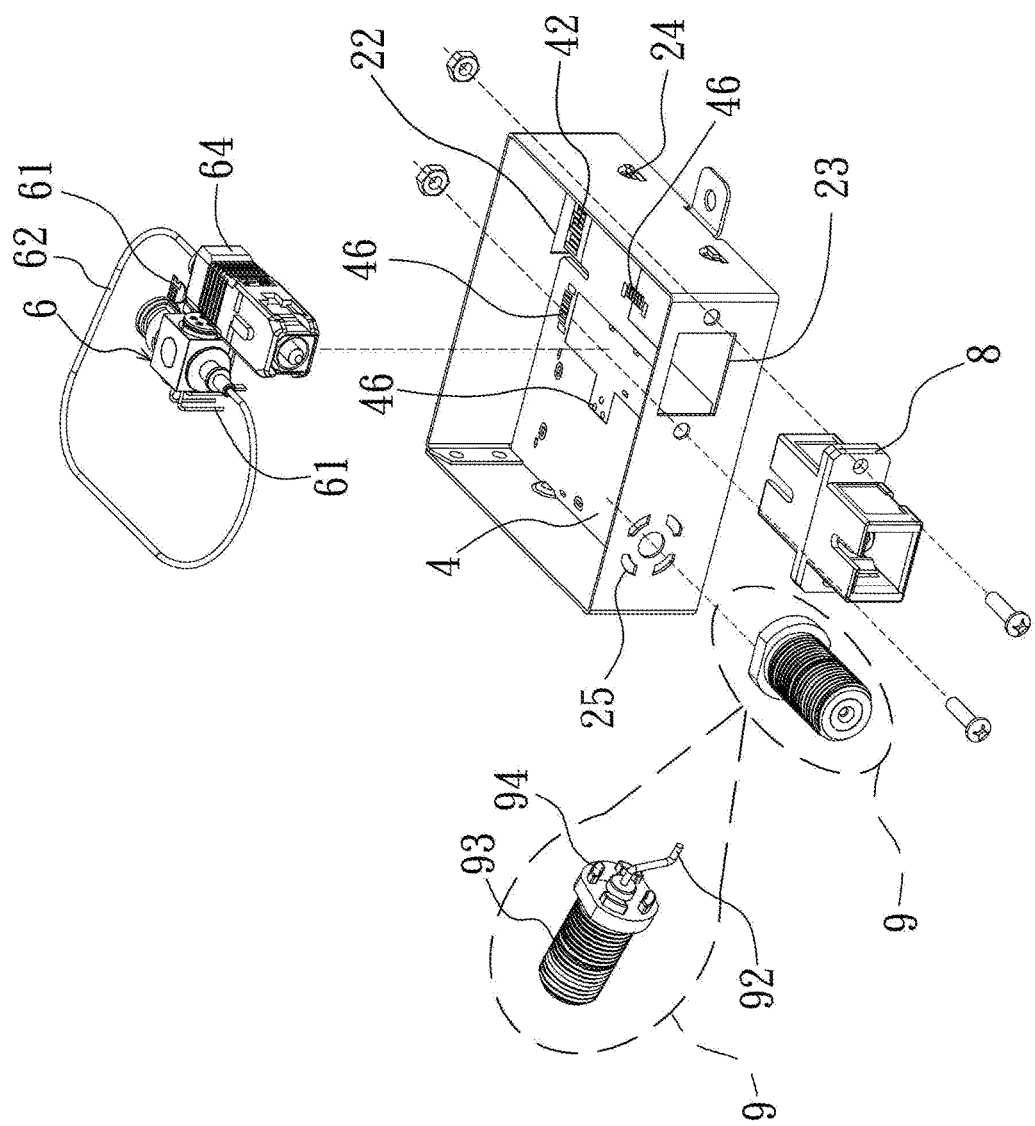
FIG. 2 is a schematic prospective exploded first view of the passive optical network device of FIG. 1, according to an example embodiment.
Figure 3:
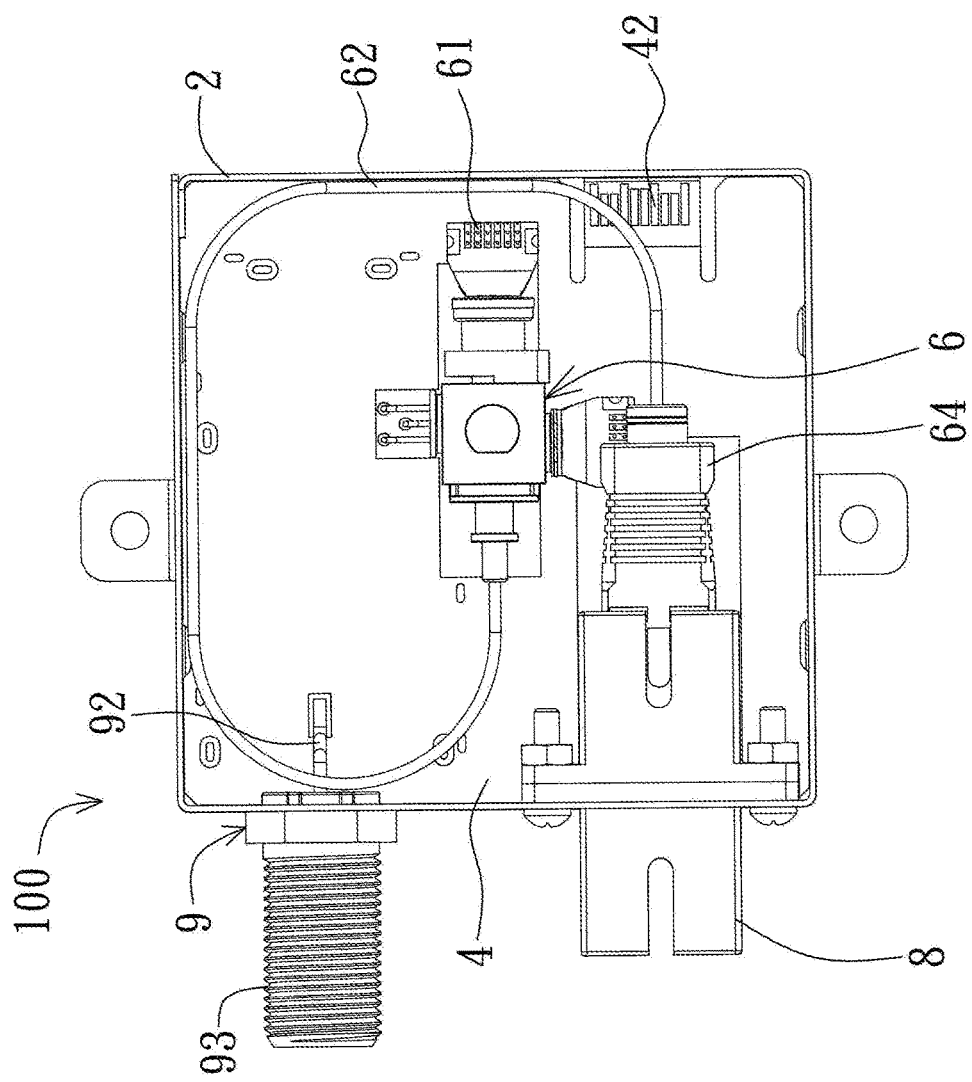
FIG. 3 is a schematic prospective fourth view of the passive optical network device of FIG. 1, according to an example embodiment.

FIG. 1 is a schematic prospective first view of an inside of a passive optical network device, according to an example embodiment. FIG. 2 is a schematic prospective exploded first view of the passive optical network device of FIG. 1, according to an example embodiment. FIG. 3 is a schematic prospective fourth view of the passive optical network device of FIG. 1, according to an example embodiment. Referring to FIGS. 1 to 3, in an embodiment, a passive optical network device 100, comprising a casing 2, a printed circuit board 4, and a fiber optic transceiver system is provided. The casing 2 has a first opening 22, a first side wall, and a second side wall. The printed circuit board 4 is fixedly assembled to the casing 2 and has a plurality of first electrical coupling pads 46, a second electrical coupling pad, and a hot-pluggable transceiver connector mating interface 42. The hot-pluggable transceiver connector mating interface 42 is positioned for mounting from an outside of the casing 2 via the first opening 22. The fiber optic transceiver system is fixedly assembled to the printed circuit board 4 and has a fiber optic components device 6 assembled to the printed circuit board 4, a fiber optic transceiver 64 assembled to the first side wall, and an RF connector 9 assembled to the second side wall, comprising an RF signal line 92 electrically coupled to the second electrical coupling pad and a threaded portion 93 positioned outside of the casing 2 and configured for mating with RF signal lines of additional external electronic systems. In some embodiments, the RF signal line 92 is electrically coupled to the second electrical coupling pad via welding. The fiber optic components device 6 comprises a plurality of electrical coupling lines 61 electrically coupled to the plurality of first electrical coupling pads 46, respectively.

In some embodiments, the fiber optic transceiver system further comprises a fiber optic cable 62, electrically coupling the fiber optic transceiver 64 to the fiber optic components device 6. In some embodiments, the hot-pluggable transceiver connector mating interface 42 is a small form-factor pluggable (SFP) transceiver connector mating interface. In some embodiments, the fiber optic components device 6 comprises a single fiber three-wavelength triplexer. In some embodiments, the fiber optic components device 6 comprises a single fiber two-wavelength diplexer.

In some embodiments, the passive optical network device 100 further comprises a fiber optic connector housing 8 having an external port and an internal port and the casing 2 further comprises a second opening 23 through the first side wall thereof. The fiber optic connector housing 8 is assembled to the second opening 23. In some embodiments, the fiber optic connector housing 8 is assembled to the second opening 23 via screws. The internal port is positioned facing an inside of the casing 2 and the external port is positioned facing an outside of the casing 2. The fiber optic transceiver 64 is mounted to the internal port and the external port is configured to attachably receive external fiber optic connectors. In some embodiments, the external fiber optic connector is a subscriber connector (SC) connector.

In some embodiments, the fiber optic transceiver 64 comprises a single mode SC fiber optic pigtail. In some embodiments, the casing 2 further comprises a plurality of third openings 25 on the second side wall thereof, respectively, and the RF connector 9 further comprises a plurality of protrusions 94. The shape of the plurality of protrusions 94 corresponds to the shape of the plurality of third openings 25, and the plurality of protrusions 94 is fixedly received in the plurality of third openings 25 when the RF connector 9 is assembled to the second side wall. In some embodiments, the shape of at least one of the plurality of third openings 25 and plurality of protrusions 94 is arc-shaped.

In some embodiments, the first side wall is the same side wall as the second side wall, whereby the RF connector 9 is assembled next to the fiber optic transceiver 64.

In an alternative embodiment, a passive optical network device 100, comprising a casing 2, a printed circuit board 4, a fiber optic connector housing 8, and a fiber optic transceiver system is provided. The casing 2 has a first opening 22, a first side wall, a second opening 23 through the first side wall, and a second side wall. In some alternative embodiments, the fiber optic connector housing 8 is assembled to the second opening 23 via screws. The printed circuit board 4 is fixedly assembled to the casing 2 and has a plurality of first electrical coupling pads 46, a second electrical coupling pad, and a hot-pluggable transceiver connector mating interface 42. The hot-pluggable transceiver connector mating interface 42 is positioned for mounting from an outside of the casing 2 via the first opening 22. The fiber optic connector housing 8 has an external port and an internal port, wherein the fiber optic connector housing 8 is assembled to the second opening 23. The internal port is positioned facing an inside of the casing 2 and the external port is positioned facing an outside of the casing 2. The fiber optic transceiver system is fixedly assembled to the printed circuit board 4 and has a fiber optic components device 6 assembled to the printed circuit board 4, a fiber optic transceiver 64 mounted to the internal port and an RF connector 9 assembled to the second side wall, comprising an RF signal line 92 electrically coupled to the second electrical coupling pad and a threaded portion 93 positioned outside of the casing 2 and configured for mating with RF signal lines of additional external electronic systems. In some embodiments, the RF signal line 92 is electrically coupled to the second electrical coupling pad via welding.

The fiber optic components device 6 comprises a plurality of electrical coupling lines 61 electrically coupled to the plurality of first electrical coupling pads 46, respectively. The external port is configured to attachably receive external fiber optic connectors. In some embodiments, the external fiber optic connector is a subscriber connector (SC) connector.

In some alternative embodiments, the fiber optic transceiver system further comprises a fiber optic cable 62, electrically coupling the fiber optic transceiver 64 to the fiber optic components device 6. In some alternative embodiments, the hot-pluggable transceiver connector mating interface 42 is a small form-factor pluggable (SFP) transceiver connector mating interface. In some alternative embodiments, the fiber optic components device 6 comprises a single fiber three-wavelength triplexer. In some alternative embodiments, the fiber optic components device 6 comprises a single fiber two-wavelength diplexer. In some alternative embodiments, the fiber optic transceiver 64 comprises a single mode SC fiber optic pigtail.

In some alternative embodiments, the casing 2 further comprises a plurality of third openings 25 on the second side wall thereof, respectively, and the RF connector 9 further comprises a plurality of protrusions 94. The shape of the plurality of protrusions 94 corresponds to the shape of the plurality of third openings 25, and the plurality of protrusions 94 is fixedly received in the plurality of third openings 25 when the RF connector 9 is assembled to the second side wall. In some alternative embodiments, the shape of at least one of the plurality of third openings 25 and plurality of protrusions 94 is arc-shaped.

In some alternative embodiments, the first side wall is the same side wall as the second side wall, whereby the RF connector 9 is assembled next to the fiber optic transceiver 64.

In the embodiments, during operation, the fiber optic components device 6 converts optical signals from the fiber optic transceiver 64 to digital signals, which is then transmitted through metal circuitry of the printed circuit board 4 to the hot-pluggable transceiver connection interface 42, and then to external electronic systems. Additionally, the fiber optic components device 6 converts digital signals from the external electronic systems, transmitted to the hot-pluggable transceiver connection interface 42, and then to the fiber optic components device 6 via the metal circuitry of the printed circuit board 4, to optical signals, which is then transmitted to the fiber optic transceiver 64, and then to other external electronic systems.

In the embodiments, during operation, the RF connector 9 transmits RF signals from the additional external electronic systems to the external electronic systems via the RF signal line 92, metal circuitry of the printed circuit board 4, and the hot-pluggable transceiver connection interface 42, respectively. Additionally, the RF connector 9 transmits digital signals from the external electronic systems to the additional external electronic systems via the hot-pluggable transceiver connection interface 42, metal circuitry of the printed circuit board 4, and RF signal line 92, respectively.

In some embodiments, the plurality of protrusions 94 is fixedly received in the plurality of third openings 25 when the RF connector 9 is assembled to the second side wall via a riveting process. Pressure is applied to force the plurality of protrusions 94 into the plurality of third openings 25, wherein at least one of the plurality of protrusions 94 is fixed in a corresponding one of the plurality of third openings 25, whereby the at least one of the plurality of protrusions 94 is deformed, such that an edge size thereof is larger than the size of the corresponding one of the plurality of third openings 25.

In some embodiments, the hot-pluggable transceiver connector mating interface 42 may be an SFF-8083 specification compliant mating interface for a 0.8 mm card edge connector configured for use in multi-gigabit applications using the upper row of contacts. As an example, and not to be limited, the SFF-8083 specification compliant mating interface may be a receptacle connector for an SFF-8432 Improved Pluggable Formfactor when used with SFF-8431 Enhanced 8.5 and 10 Gbit/s SFP+ modules.

In some embodiments, the hot-pluggable transceiver connector mating interface 42 is a small form-factor pluggable (SFP) transceiver connector mating interface; however, the embodiments are not limited thereto. Paddle card connector mating interfaces or USB or HDMI connector mating interfaces may be also be implemented, whereby the contacts may be 20 or 30 contacts.

In the embodiments, the size and positioning of the hot-pluggable transceiver connector mating interface 42 via the first opening 22 of the casing 2 is in compliance with SFP specification requirements; however, the embodiments are not limited thereto. Those having of ordinary skill in the relevant art may readily appreciate that the size and positioning of the hot-pluggabe transceiver connector mating interface 42 is dependent upon the suitable compliant mating interface implemented.

In some embodiments, the plurality of electrical coupling lines 61 of the fiber optic components device 6 is electrically coupled to the plurality of first electrical coupling pads 46 via soldering and the plurality of electrical coupling lines 61 comprises multiple sets of electrical coupling lines.

In the embodiments, the material of the casing 2 is any conductive or magnetic electromagnetic shielding material known to those having ordinary skill in the relevant art, whereby the printed circuit board 4, fiber optic components device 6, fiber optic transceiver 64, and RF connector 9 may be isolated from surroundings of the casing 2. As an example, and not to be limiting, the material may be stainless steel, copper, zinc, or nickel or alloys comprised therefrom.

In the embodiments, the size of the casing 2 may be 2" inches long, 2" inches wide, and 0.7" inches high; however, the embodiments are not limited thereto. In some embodiments, the length, width, and height of the casing 2 may be between 1.4" inches to 5" inches, respectively.

In the embodiments, the material of the casing 2 may be any conductive or magnetic electromagnetic shielding material known to those having ordinary skill in the relevant art, whereby the printed circuit board 4, fiber optic components device 6, fiber optic transceiver 64, and RF connector 9 may be isolated from the surroundings of the casing 2. As an example, and not to be limiting, the material may be stainless steel, copper, zinc, or nickel or alloys comprised therefrom.

In some embodiments, the passive optical network device 100 further comprises a plurality of latch mechanism (not shown) and a plurality of fourth openings 24. The printed circuit board 4 is fixedly assembled to the casing 2 via the plurality of latch mechanism, whereby the plurality of latch mechanisms is accessible from the outside of the casing 2 via the plurality of fourth openings 24.

The IEEE 802.3av standard or 10G-EPON standard provides 10 Gbits/s downstream and upstream transmission rates for symmetric architectures or 10 Gbits/s downstream and 1 Gbits/s upstream transmission rates for asymmetric architectures. The wavelength (λ) of 1575 to 1580 nm transmits the downstream data and the wavelength of 1260 to 1280 nm transmits the upstream data for 10G-EPON and the wavelength (λ) of 1260 to 1360 nm transmits the downstream data and the wavelength of 1480 to 1500 nm transmits the upstream data for 1G-EPON. The 10-Gbit/s service may coexist on the same fiber with the standard GPON, and maximum transmission range is 20 km.

In the embodiments, a passive optical network device comprising a casing, printed circuit board, and fiber optic transceiver system is provided. The fiber optic transceiver system comprises a fiber optic components device, fiber optic transceiver, and RF connector. During operation, the fiber optic components device converts optical signals from the fiber optic transceiver to digital signals, and then transmits the converted digital signals to external electronic systems via the hot-pluggable transceiver connection interface. The fiber optic components device converts digital signals from the external electronic systems to optical signals, and then transmits the optical signals to other external electronic systems via the fiber optic transceiver. The RF connector transmits RF signals from additional external electronic systems to the external electronic systems via the hot-pluggable transceiver connection interface. The RF connector transmits digital signals from the external electronic systems to the additional external electronic systems via the hot-pluggable transceiver connection interface.

The embodiments of the passive optical network devices provide a hot-pluggable transceiver connector mating interface, positioned for mounting from an outside of the casing via a first opening, supporting 10-Gbit/s services. In an embodiment, the hot-pluggable transceiver connector mating interface is a receptacle connector for an SFF-8432 Improved Pluggable Formfactor when used with SFF-8431 Enhanced 8.5 and 10 Gbit/s SFP+ modules. The modules mounted to the hot-pluggable transceiver connector mating interface may be easily maintained, replaced, or upgraded. The embodiments of the passive optical network devices are suited to support the 10 Gbit/s standard higher transmission rates. Additionally, time consuming and inconvenient maintenance or replacement of other devices installed to the passive optical network devices via the pins is mitigated due to the hot-pluggable transceiver connector mating interface. Moreover, immediate replacement is now available, eliminating potential problems when other device failure occurs. Also, passive optical network device compatibility or increasing signal attenuation and inconvenience issues due to a fixed length of the single mode SC fiber optic pigtail of the optical transceiver module extending to the outside of the GPON device casing is eliminated.

The presently disclosed inventive concepts are not intended to be limited to the embodiments shown herein, but are to be accorded their full scope consistent with the principles underlying the disclosed concepts herein. Directions and references to an element, such as "up," "down,", "upper," "lower," "horizontal," "vertical," "left," "right," and the like, do not imply absolute relationships, positions, and/or orientations. Terms of an element, such as "first" and "second" are not literal, but, distinguishing terms. As used herein, terms "comprises" or "comprising" encompass the notions of "including" and "having" and specify the presence of elements, operations, and/or groups or combinations thereof and do not imply preclusion of the presence or addition of one or more other elements, operations and/or groups or combinations thereof. Sequence of operations do not imply absoluteness unless specifically so stated. Reference to an element in the singular, such as by use of the article "a" or "an", is not intended to mean "one and only one" unless specifically so stated, but rather "one or more". As used herein, "and/or" means "and" or "or", as well as "and" and "or." As used herein, ranges and subranges mean all ranges including whole and/or fractional values therein and language which defines or modifies ranges and subranges, such as "at least," "greater than," "less than," "no more than," and the like, mean subranges and/or an upper or lower limit. All structural and functional equivalents to the elements of the various embodiments described throughout the disclosure that are known or later come to be known to those of ordinary skill in the relevant art are intended to be encompassed by the features described and claimed herein. Moreover, nothing disclosed herein is intended to be dedicated to the public regardless of whether such disclosure may ultimately explicitly be recited in the claims. No element or concept disclosed herein or hereafter presented shall be construed under the provisions of 35 USC 112(f) unless the element or concept is expressly recited using the phrase "means for" or "step for".

In view of the many possible embodiments to which the disclosed principles can be applied, we reserve the right to claim any and all combinations of features and acts described herein, including the right to claim all that comes within the scope and spirit of the foregoing description, as well as the combinations recited, literally and equivalently, in the following claims and any claims presented anytime throughout prosecution of this application or any application claiming benefit of or priority from this application.

What is claimed is:

1. A passive optical network device, comprising:
   a casing having a first opening, a first side wall, and a second side wall;
   a printed circuit board fixedly assembled to the casing, having a plurality of first electrical coupling pads, a second electrical coupling pad, and a hot-pluggable transceiver connector mating interface, whereby the hot-pluggable transceiver connector mating interface is positioned for mounting from an outside of the casing via the first opening, and the hot-pluggable transceiver connector mating interface is a small form-factor pluggable (SFP) transceiver connector mating interface; and
   a fiber optic transceiver system fixedly assembled to the printed circuit board, having a fiber optic components device assembled to the printed circuit board, comprising a plurality of electrical coupling lines electrically coupled to the plurality of first electrical coupling pads, respectively, a fiber optic transceiver assembled to the first side wall, and an RF connector assembled to the second side wall, comprising an RF signal line electrically coupled to the second electrical coupling pad,
   wherein the first side wall is the same side wall as the second side wall, and wherein the first opening is on a side wall opposite the first side wall and the second side wall, whereby the RF connector is assembled next to the fiber optic transceiver and opposite the small form-factor pluggable (SFP) transceiver connector mating interface, and
   wherein the passive optical network device is configured to support 10 gigabits per second data transmission rates and RF signals.

2. The passive optical network device of claim 1, wherein the fiber optic transceiver system further comprises a fiber optic cable, the fiber optic cable electrically coupling the fiber optic transceiver to the fiber optic components device.

3. The passive optical network device of claim 1, wherein the fiber optic components device comprises a single fiber three-wavelength triplexer.

4. The passive optical network device of claim 1, wherein the fiber optic components device comprises a single fiber two-wavelength diplexer.

5. The passive optical network device of claim 1, wherein the passive optical network device further comprises a fiber optic connector housing having an external port and an internal port and the casing further comprises a second opening through the first side wall thereof, wherein the fiber optic connector housing is assembled to the second opening, whereby the internal port is positioned facing an inside of the casing and the external port is positioned facing an outside of the casing, and the fiber optic transceiver is mounted to the internal port and the external port is configured to attachably receive external fiber optic connectors.

6. The passive optical network device of claim 1, wherein the fiber optic transceiver comprises a single mode subscriber connector (SC) fiber optic pigtail.

7. The passive optical network device of claim 1, wherein the casing further comprises a plurality of third openings on the second side wall thereof, respectively, and the RF connector further comprises a plurality of protrusions, whereby the shape of the plurality of protrusions corresponds to the shape of the plurality of third openings, and the plurality of protrusions is fixedly received in the plurality of third openings when the RF connector is assembled to the second side wall.

8. The passive optical network device of claim 7, wherein the shape of at least one of the plurality of third openings and plurality of protrusions is arc-shaped.

9. The passive optical network device of claim 2, wherein the fiber optic components device assembled to the printed circuit board is assembled next to the fiber optic transceiver, and an end of the fiber optic cable electrically couples to the fiber optic components device via a side of the fiber optic components device facing the first side wall and the second side wall and an opposing end of the fiber optic cable electrically couples to the fiber optic transceiver via a side of the fiber optic transceiver facing the side wall of the first opening.

10. A passive optical network device, comprising:
a casing having a first opening, a first side wall, a second opening through the first side wall, and a second side wall;
a printed circuit board fixedly assembled to the casing, having a plurality of first electrical coupling pads, a second electrical coupling pad, and a hot-pluggable transceiver connector mating interface, whereby the hot-pluggable transceiver connector mating interface is positioned for mounting from an outside of the casing via the first opening, and the hot-pluggable transceiver connector mating interface is a small form-factor pluggable (SFP) transceiver connector mating interface;
a fiber optic connector housing having an external port and an internal port, wherein the fiber optic connector housing is assembled to the second opening, whereby the internal port is positioned facing an inside of the casing and the external port is positioned facing an outside of the casing; and
a fiber optic transceiver system fixedly assembled to the printed circuit board, having a fiber optic components device assembled to the printed circuit board, comprising a plurality of electrical coupling lines electrically coupled to the plurality of first electrical coupling pads, respectively, a fiber optic transceiver mounted to the internal port, and an RF connector assembled to the second side wall, comprising an RF signal line electrically coupled to the second electrical coupling pad,
whereby the external port is configured to attachably receive external fiber optic connectors and
wherein the first side wall is the same side wall as the second side wall, and wherein the first opening is on a side wall opposite the second opening and the second side wall, whereby the RF connector is assembled next to the fiber optic transceiver and opposite the small form-factor pluggable (SFP) transceiver connector mating interface, and
wherein the passive optical network device is configured to support 10 gigabits per second data transmission rates and RF signals.

11. The passive optical network device of claim 10, wherein the fiber optic transceiver system further comprises a fiber optic cable, the fiber optic cable electrically coupling the fiber optic transceiver to the fiber optic components device.

12. The passive optical network device of claim 10, wherein the fiber optic components device comprises a single fiber three-wavelength triplexer.

13. The passive optical network device of claim 10, wherein the fiber optic components device comprises a single fiber two-wavelength diplexer.

14. The passive optical network device of claim 10, wherein the fiber optic transceiver comprises a single mode subscriber connector (SC) fiber optic pigtail.

15. The passive optical network device of claim 10, wherein the casing further comprises a plurality of third openings on the second side wall thereof, respectively, and the RF connector further comprises a plurality of protrusions, whereby the shape of the plurality of protrusions corresponds to the shape of the plurality of third openings, and the plurality of protrusions is fixedly received in the plurality of third openings when the RF connector is assembled to the second side wall.

16. The passive optical network device of claim 15, wherein the shape of at least one of the plurality of third openings and plurality of protrusions is arc-shaped.

17. The passive optical network device of claim 11, wherein the fiber optic components device assembled to the printed circuit board is assembled next to the fiber optic transceiver, and an end of the fiber optic cable electrically couples to the fiber optic components device via a side of the fiber optic components device facing the second opening and the second side wall and an opposing end of the fiber optic cable electrically couples to the fiber optic transceiver via a side of the fiber optic transceiver facing the side wall of the first opening.

\* \* \* \* \*